United States Patent
Loizeaux et al.

(10) Patent No.: US 8,380,843 B2
(45) Date of Patent: Feb. 19, 2013

(54) SYSTEM AND METHOD FOR DETERMINING AFFINITY GROUPS AND CO-LOCATING THE AFFINITY GROUPS IN A DISTRIBUTING NETWORK

(75) Inventors: Jane Alice Loizeaux, Lowell, MA (US); James H. Waldo, Dracut, MA (US); Keith Benjamin Thompson, Brookline, NH (US)

(73) Assignee: Oracle America, Inc., Redwood City, CA (US)

( * ) Notice: Subject to any disclaimer, the term of this patent is extended or adjusted under 35 U.S.C. 154(b) by 546 days.

(21) Appl. No.: 12/556,672

(22) Filed: Sep. 10, 2009

(65) Prior Publication Data

US 2011/0060821 A1 Mar. 10, 2011

(51) Int. Cl.
*G06F 15/16* (2006.01)
(52) U.S. Cl. ...................................................... 709/224
(58) Field of Classification Search .................... 709/224
See application file for complete search history.

(56) References Cited

U.S. PATENT DOCUMENTS

| | | | | |
|---|---|---|---|---|
| 2008/0140650 | A1* | 6/2008 | Stackpole | 707/5 |
| 2009/0112616 | A1* | 4/2009 | Jung et al. | 705/2 |
| 2010/0312809 | A1* | 12/2010 | Calder et al. | 707/912 |

OTHER PUBLICATIONS

Anna Hac, "Load Balancing in Distributed Systems: A Summary", Performance Evaluation Review, vol. 16, #2-4, Feb. 1989, pp. 17-19, AT&T Bell Laboratories, Naperville, Il 60566.
Fengyun Lu, "Load Balancing for Massively Multiplayer Online Games", Fengyute University, The 5th Workshop on Network & System Support for Games 2006—NETGAMES 2006, Copyright 2006, pp. 1-11.
Peter Quax et al., "Dynamic Server Allocation in a Real-life Deployable Communications Architecture for Networked Games", Hasselt University, Belgium, NV, Copyright 2008, 6 pages.
http://aws.amazon.com/elasticloadbalancing, 2 pages, Sep. 10, 2009.

* cited by examiner

*Primary Examiner* — Wing F Chan
*Assistant Examiner* — Andrew Woo
(74) *Attorney, Agent, or Firm* — Brooks Kushman P.C.

(57) ABSTRACT

In at least one embodiment, an apparatus for determining one or more affinity groups in a distributed network is provided. A first distributed computing device is operably coupled to a plurality of clients for enabling electronic interactive activities therebetween. The first distributed computing device is configured to detect at least one network interaction among the plurality of clients. The first distributed computing device is further configured to generate at least one weighted value based on the number of detected network interactions. The first distributed computing device is further configured to establish an affinity group comprising at least one client from the plurality of clients based on the at least one weighted value.

10 Claims, 4 Drawing Sheets

SYSTEM AND METHOD FOR DETERMINING AFFINITY GROUPS AND CO-LOCATING THE AFFINITY GROUPS IN A DISTRIBUTING NETWORK

BACKGROUND

1. Technical Field

The embodiments of the present invention generally relate to a system and method for determining affinity groups and co-locating the affinity groups to various nodes in a distributed network.

2. Background Art

A distributed network is generally defined as a connected network consisting of numerous computers (or nodes) positioned throughout multiple locations that are capable of communicating with one another. These computers appear to users as part of single large network of shared hardware and software. The intent of the distributed network is to appear to users as a single system. A policy may be needed to determine what tasks are executed on the various nodes throughout the network. A task is generally defined as a unit of computation that is performed on behalf of a user from a computing device within the distributed network. For horizontal scalability, it is preferable to balance loads between the nodes so that each node is utilized effectively.

Common approaches to load balancing include performing a simple Domain Name System (DNS) round robin assignment or the use of a hardware based load balancer. The latter, while more expensive, may have the advantage of maintaining an affinity between a client and a particular node (which is part of the distributed network) in the system. More complex load balancers take into account system health to ensure that no node (or computing device within the network) is overwhelmed and also to detect when a node can be disconnected from other nodes in the network due to under use. Such common approaches may be adequate when the set of resources are stable or when tasks that are undertaken by the nodes are independent. However, these approaches may not be suited to efficiently handle tasks when the set of resources are generally dynamic in nature or when the tasks communicate with each other or require access to common information.

SUMMARY

In at least one embodiment, an apparatus for determining one or more affinity groups in a distributed network is provided. A first distributed computing device is operably coupled to a plurality of clients for enabling electronic interactive activities therebetween. The first distributed computing device is configured to detect at least one network interaction among the plurality of clients. The first distributed computing device is further configured to generate at least one weighted value based on the number of detected network interactions. The first distributed computing device is further configured to establish an affinity group comprising at least one client from the plurality of clients based on the at least one weighted value.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In modern distributed networks it may be necessary to add or remove resources over time. There are workloads (such as on-line games and virtual worlds or other suitable interactive activities in which users remotely participate with one another via nodes in the network) where not only are the tasks that are under taken by the various nodes variable in nature, but they are connected in different ways to one another. In these cases, it may be necessary to (i) move tasks from one node to another node in the network; (ii) determine which tasks need to be moved, (iii) determine which nodes such tasks need to be moved to, and (iv) determine when such tasks need to be moved. The aforementioned operations as noted directly above may complicate the work of the conventional hardware based load balancer.

In a distributed network that enables games and virtual worlds where the various tasks and players interact remotely from one another, the issue is not merely to move particular tasks, but also to group interacting tasks together on a single node within the distributed network. Such a grouping may be needed to achieve low latencies that may be required in the interactive systems. If the interaction is mediated by the network, the additional latencies associated with the communication between the nodes in the network may overwhelm the interactive response and degrade performance in the network.

Conventional system/methods such as DNS round robin and hardware load balancing are incapable of dealing with dynamically balancing tasks between the nodes over time and clustering interacting tasks on a particular node in order to minimize latency. For example, conventional DNS round robin implementations and hardware load balancers are not configured to determine dynamic behaviors of the various tasks being performed by the nodes and are therefore not capable of clustering similar tasks on a single node to minimize latency.

The embodiments of the present invention generally, among other things, provide a system and method for determining affinity groups among users who utilize nodes within a distributed network and for moving the affinity groups and its corresponding users to selected nodes that are determined to have increased capacity or are otherwise efficient enough to handle requests for that particular affinity group.

Figure 1A:
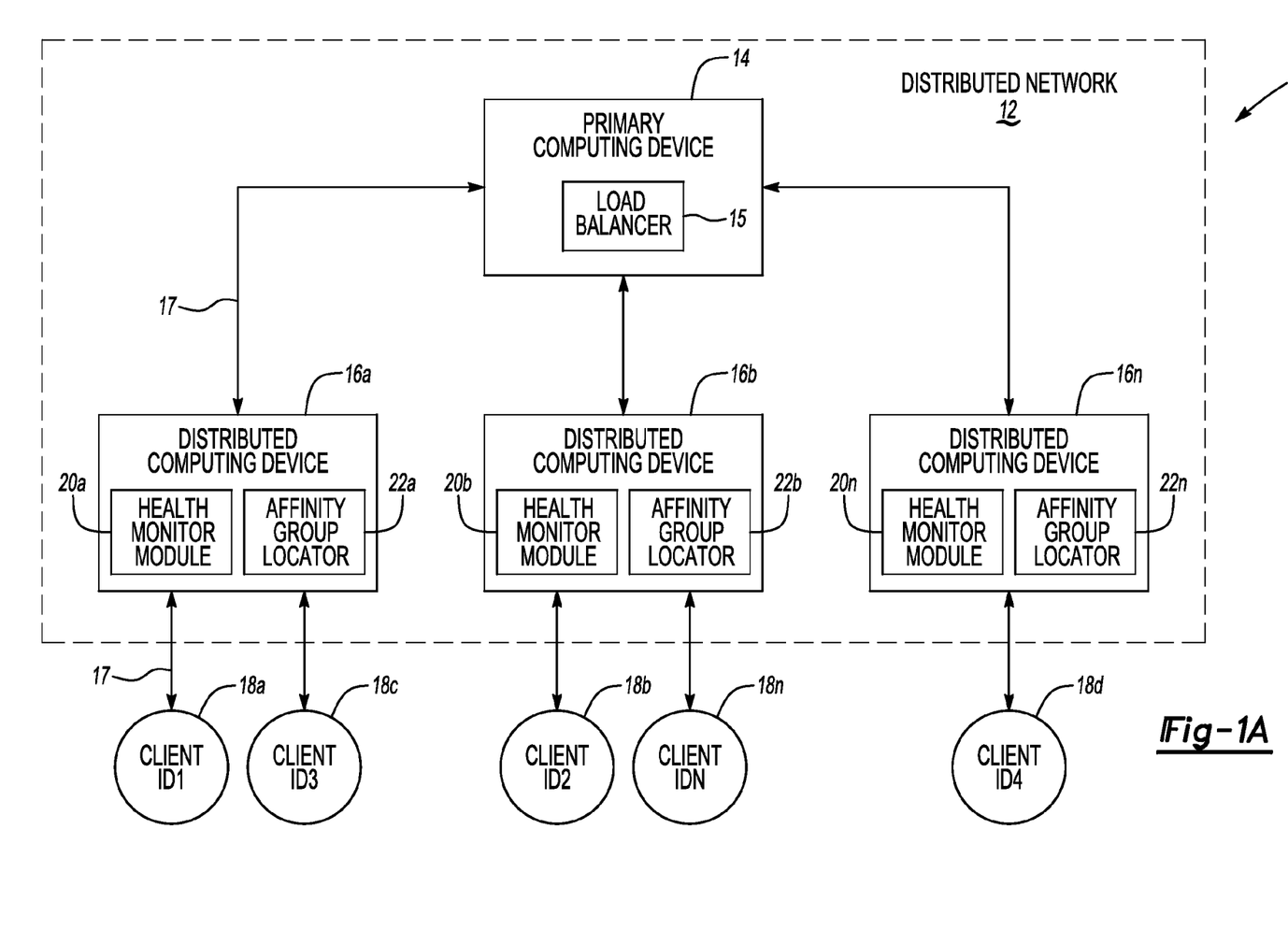
FIGS. 1a-1b depict a system for determining and moving affinity groups in a distributed network in accordance to one embodiment of the present invention.
Figure 1B:
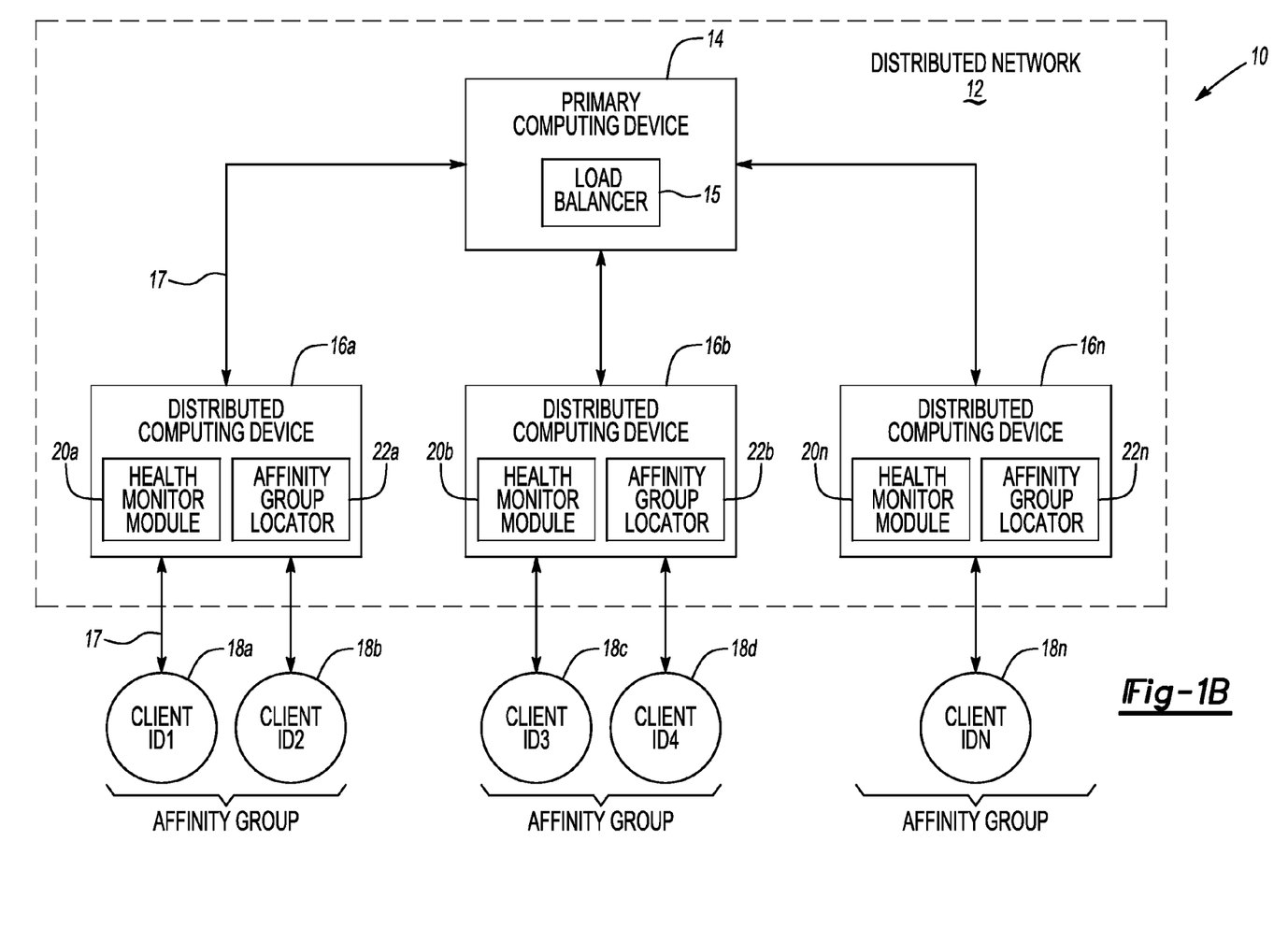

FIGS. 1a-1b depict a system 10 for determining and moving affinity groups in a distributed network 12 in accordance to one embodiment of the present invention. The system 10 includes a primary computing device 14 and a plurality of distributed computing devices 16a-16n. The primary computing device 14 and the distributed computing devices 16a-16n bi-directionally communicate with one another over a communication link 17. The communication link 17 may be implemented as a Transmission Control Protocol/Internet Protocol (TCP/IP), Ethernet, Infiban, User Datagram Protocol (UDP) or other suitable communication protocol that enables communication between the primary computing device 14 and the distributed computing devices 16a-16n. The type of communication link used in the system 10 may vary based on the desired criteria of a particular implementation.

A plurality of clients 18a-18n are operably coupled to the distributed computing devices 16a-16n. FIG. 1a generally illustrates that the clients 18a-18n are operably coupled to the distributed computing devices 16a-16n in any order. Users are capable of transmitting/receiving data (information) to/from any one or more of the distributed computing devices 16a-16n within the network 12 via the clients 18a-18n. The communication link 17 further enables bi-directional communication between the distributed computing devices 16a-16n and the clients 18a-18n. It is contemplated that particular communication link used to enable communication between the distributed computing devices 16a-16n and the clients 18a-18n may be different than the type of communication link used to enable communication between the primary computing device 14 and the distributed computing devices 16a-16n. Each client 18a-18n may be given an identity to identify the user that is using the respective client 18a-18n to the one or more of the distributed computing devices 16a-16n. Each distributed computing device 16a-16n and each client 18a-18n is geographically positioned apart from one another.

In general, the distributed network 10 is a connected network in which the primary computing device 14 and the distributed computing devices 16a-16n may be positioned throughout multiple geographical locations and appear to the clients 18a-18n as part of a single large network of shared hardware and software (or system). The primary computing device 14 and the plurality of distributed computing devices 16a-16n each include, but not limited to, any number of microprocessors, ASICs, ICs, memory devices, and software that co-act with one another to perform the various functions described herein.

The primary computing device 14 and the plurality of distributed computing devices 16a-16n generally enable the users positioned at the clients 18a-18n the ability to utilize various interactive activities with one another while the users are geographically positioned apart from one another. For example, the user (or ID1) at the client 18a may be positioned in Boston, Mass. whereas the user (or ID2) may be positioned in Santa Clara, Calif. The clients 18a and 18b may be operably coupled to the distributed computing device 16a so that the users (ID1 and ID2) partake in interactive activities provided on the distributed computing device 16a. Such interactive activities may be in the form of virtual worlds, on-line games or other suitable interactive activities. A virtual world is generally defined as a computer-based simulated environment in which its users can interact with another. Various examples of virtual worlds may include, but not limited to, Second Life, on-line classrooms, and training simulators.

FIG. 1a depicts an arrangement in which particular groups of clients 18a-18n may be utilizing multiple distributed computing devices 16a-16n to interact with each other (e.g., or have tasks processed). For example, a particular group of clients (e.g., client ID1 and client ID2) may be engaged in a game or other interactive electronic event together where tasks are undertaken by the distributed computing devices 16a and 16b. However, it is recognized that is may be more efficient to group clients who share similar interactions on a single distributed computing device for efficiency purposes.

FIG. 1b depicts an arrangement in which the clients 18a-18n are grouped together in a particular affinity group based on the corresponding interactions with one another. The users (ID1 and ID2) form a first affinity group, the users (ID3 and ID4) for a second affinity group, and the user (IDN) forms a third affinity group. The affinity groups and operations performed by the system 10 to establish and link the various affinity groups to a particular distributed computing device 16a-16n will be discussed in more detail below.

The primary computing device 14 includes a load balancer 15 that is operably coupled to the distributed computing devices 16a-16n. The distributed computing devices 16a-16n include health monitor modules 20a-20n, respectively. The distributed computing devices 16a-16n further include affinity group locators 22a-22n, respectively.

The affinity group locators 22a-22n are generally configured to determine which clients 18a-18n form a particular affinity group by performing social network analysis (SNA) which includes, but not limited to, performing clustering analysis. For example, as part of performing the social network analysis, the distributed computing devices 16a-16n may form the affinity group(s) by monitoring network interactions such as, but not limited to, the types of data that is being accessed by the clients 18a-18n from the distributed computing devices 20a-20n (or similar instances of data that are accessed by the clients 18a-18n), communication patterns between the clients 18a-18n, and/or historical information between the clients 20a-20n that communicate with one another. Applications running with the corresponding distributed computing device may also identify various clients that can be formed into an affinity group. For example, an application that runs a virtual classroom in which a plurality of clients are participating in the classroom may identify this pool of clients and notify a particular distributed computing device that the pool of clients should belong to the same affinity group.

By performing social network analysis, the users of the various clients are assigned to a particular affinity group and tied to a distributed computing device. It is recognized that such a grouping of clients (or users) who are engaged in similar social networks generally access similar types of data, similar instances of data communication and/or communicate among themselves. Therefore, it follows that it may be desirable to group the users into a affinity group and to tie that particular affinity group to a common distributed computing device to optimize efficiency for that distributed computing device and to improve latency in the network 12.

Each distributed computing device 16a-16n stores a sub-graph containing the applicable affinity groups that are formed thereto based on the data collected by the affinity group locators 22a-22n. The sub-graph comprises vertices and edges. Each edge includes a weighted value that corresponds to the monitored data that is used to establish affinity groups. Each distributed computing device 16a-16n uses the weighted values and performs clustering analysis to determine its local affinity groups. This will be discussed in more detail in connection with FIG. 3. It can therefore be said that each distributed computing device 16a-16n may include a sub-graph and that the sum of the sub-graphs form an overall graph which provides a listing of all of the affinity groups that are formed in the network 12.

The storing of the sub-graphs within each distributed computing device 16a-16n may enable a scaleable (or pluggable) implementation. In another embodiment, the primary computing device 14 may simply command all of the distributed computing devices 16a-16n to transmit all monitored data so the primary computing device 14 generates the entire graph and establishes the affinity groups for the various distributed computing devices 16a-16n. In this embodiment, the distributed computing devices 16a-16n may not generate or store the sub-graphs (e.g. establish the affinity groups). The primary computing device 14 may then use the weighted values and perform clustering analysis within the entire graph to determine which affinity groups are to be assigned to corresponding distributed computing devices 16a-16n.

The distributed computing devices 16a-16n may dynamically add or remove users within the various affinity groups formed therewith in the event the interactions between the users (via the clients 18a-18n) change over time. In reference to the implementation in which the distributed computing devices 16a-16n store the sub-graphs and determine the affinity groups therefrom, prior to establishing the affinity groups, the primary computing device 14 transmits a command to the distributed computing devices 16a-16n to control the distributed computing devices 16a-16n to establish the affinity groups. The distributed computing devices 16a-16n share information with respect to the monitored data based on the social network analysis (e.g., weighed values) used to form the various affinity groups with one another. The distributed computing devices 16a-16n establish which affinity group(s) will be assigned thereto and transmit this information to the primary computing device 14. The primary computing device 14 may merge affinity groups that span multiple distributed computing devices 16a-16n so that the affinity group that spans multiple distributed computing devices 16a-16n are assigned to a single distributed computing device.

Each health monitor module 20a-20n is generally configured to transmit heath information related to the efficiency and operating capacity for each distributed computing device 16a-16n. In the event a particular distributed computing device 16a-16n experiences moments of low efficiency or high operating capacity, the load balancer 15 is configured to control one or more of the distributed computing devices 16a-16n to move one or more of the affinity groups to another distributed computing device 16a-16n that has a low operating capacity to handle tasks for the moved affinity group. Additional factors that may comprise the health information and monitored by the health monitor modules 20a-20n include related metrics such as, but not limited to, central processor unit (CPU) (e.g., processor core) utilization, the number of network connections, and/or memory. Non-resource metrics may also be included within the health information such as, but not limited to, the number of tasks waiting for processing, the amount of time a task takes to complete and/or the amount of data that is transmitted on the communication link 17.

It may desirable to keep the affinity groups intact during the co-location operation so that a single resource (e.g., a single distributed computing device) handles requests for the moved affinity group. As noted above, from a network perspective, it may be more efficient for a single distributed computing device to handle tasks for the affinity group as opposed to having multiple distributed computing devices handle and process tasks for one or more users within the affinity group.

In some instances, a single distributed computing device may handle or execute a set of tasks for users within an affinity group 10 to 100 times faster than multiple distributed computing devices separately processing those same tasks.

Figure 2:
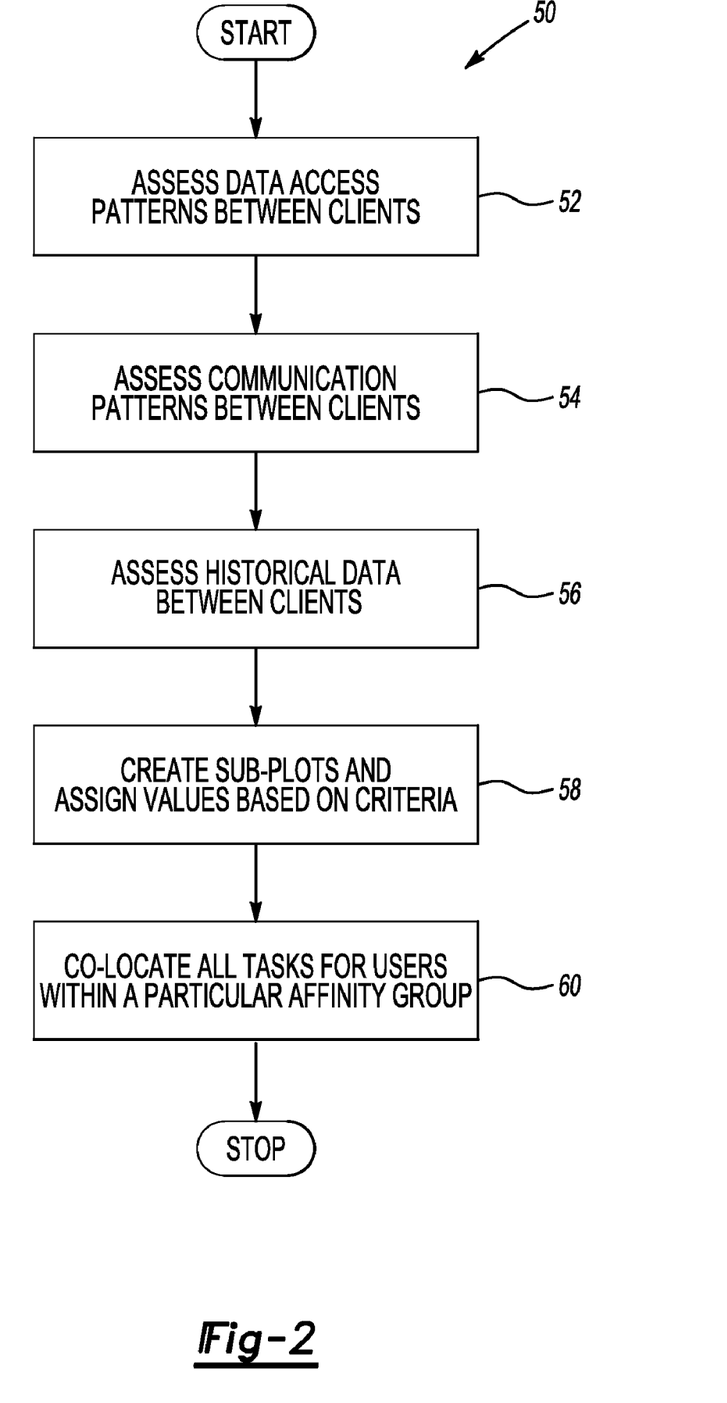
FIG. 2 depicts a method for determining affinity groups in a distributed network in accordance to one embodiment of the present invention.

FIG. 2 depicts a method 50 for establishing affinity groups in the distributed network 10 in accordance to one embodiment of the present invention. It is recognized that the operations disclosed in connection with the method 50 may be performed in any order. For example, one or more of the operations can be executed in parallel or in series. The particular order in which the operations of method 50 are executed may vary based on the desired criteria of a given implementation.

In operation 52, each distributed computing device 16a-16n is configured to monitor the types of data that is being accessed by the clients 18a-18n. Similar types of data that is being accessed between the clients 18a-18n may be one factor in assessing whether the clients 18a-18n (or users) share a similar social interaction with one another. In one example, a database (not shown) may be operably coupled to the distributed network 12. The database may include data that can be shared by the users of the system 10. Each distributed computing device 16a-16n is configured to monitor which clients read or write similar instances of data to/from the database. An example of the above condition may be exhibited in a virtual world whereby two users (or clients) may select the same book from an electronic library.

The distributed computing devices 16a-16n may generate a weighted value based on the number of interactions between the clients 18a-18n. For example, the distributed computing devices 16a-16n generates weighted values in response to detecting that two or more of the clients 18a-18n access the same or generally similar sets of data. Users who access similar sets of data may be considered to share a similar social interaction. These types of users may be assigned to the same affinity group such that the requested tasks are serviced by the same distributed computing device to reduce latency in the network 12.

In operation 54, each distributed computing device 16a-16n is configured to monitor communication patterns between the clients 18a-18n. Similar types of communication patterns that are exhibited between the clients 18a-18n and the distributed computing devices 16a-16n may be one factor in assessing whether the clients 18a-18n (or users) share a similar social interaction with one another. An example of similar types of communication patterns may involve a "chat" session in a game that enables clients to send messages to one another. The distributed computing devices 16a-16n may ascertain which clients 18a-18n has joined that chat session.

Users who exhibit similar communication patterns may share a similar social interaction. These types of users may be assigned to the same affinity group such that the requested tasks are serviced by the same distributed computing device to reduce latency in the network 12.

In operation 56, each distributed computing device 16a is configured to monitor historical data between the clients 16a-16n. For example, the distributed computing devices 16a-16n are generally configured to monitor time intervals with respect to the length of time two or more clients 16a-16n use similar data objects. If two or more clients 16a-16n use the same set of data objects multiple times (or frequently within a predetermined time interval), then such clients 16a-16n may be placed in an affinity group. If on the other hand, the clients 18a-18n use same data objects outside of the predetermined time interval, it may be inferred that such clients 18a-18n may not be placed together within a particular affinity group.

The distributed computing devices 16a-16n may generate weighted values in response to determining that two or more of the clients 18a-18n access similar data objects within the predetermined time interval. Users who are detected to access similar data objects within the predetermined time interval may exhibit similar social interactions with one another. These types of users may be assigned to the same affinity group such that requested tasks are serviced by the same distributed computing device to reduce latency in the network 12.

It is recognized that all of the data collected by the distributed computing devices 16a-16n may be discarded as such data becomes out of date. The distributed computing devices 16a-16n may continuously monitor for the data noted above in connection with operations 52, 54, and 56 and update affinity groups as needed. In another implementation, the primary computing device 14 may transmit a control signal to the distributed computing devices 16a-16n to initiate the process of monitoring the data for interactions and therefore establishing the various affinity groups in response to the monitoring.

In operation 58, each distributed computing device 16a-16n creates a sub-graph, determines the weighted values, and performs clustering analysis to establish the various affinity groups. Each distributed computing device 16a-16n is configured to communicate with one another so that each sub-graph generated by a particular distributed computing device is communicated with each other to inform each other of the various clients assigned to a particular affinity group. The distributed computing devices 16a-16n generally forms an entire single graph 70 with the sub-graph information that is received from one another. The single graph 70 indicates the various affinity groups within the network 12.

Additional factors that may exhibit various network interactions between the clients 18a-18n include, but not limited to, those who are in the same virtual geographic area, those who are in the same world shard, those who are in engaged in the interactive environment that seek a common cause (e.g., a guild or raiding party), those who have the same virtual profession, and those working on the same goal in an interactive game.

In operation 60, each distributed computing device 16a-16n co-locates all of the tasks for users who comprise a particular affinity group. For example, in reference to FIG. 1b, distributed computing device 16a co-locates all of the tasks for clients ID1 and ID2 so that all tasks that are needed to be performed for clients ID1 and ID2 are executed on a single distributed computing device. Likewise, distributed computing device 16b co-locates all of the tasks for clients ID3 and ID4 so that all tasks that are needed to be performed for clients ID3 and ID4 are executed on a single distributed computing device. Finally, distributed computing device 16n co-locates all of the tasks for client IDN so that all tasks that need to be executed for claims IDN are executed on a single distributed computing device.

Figure 3:
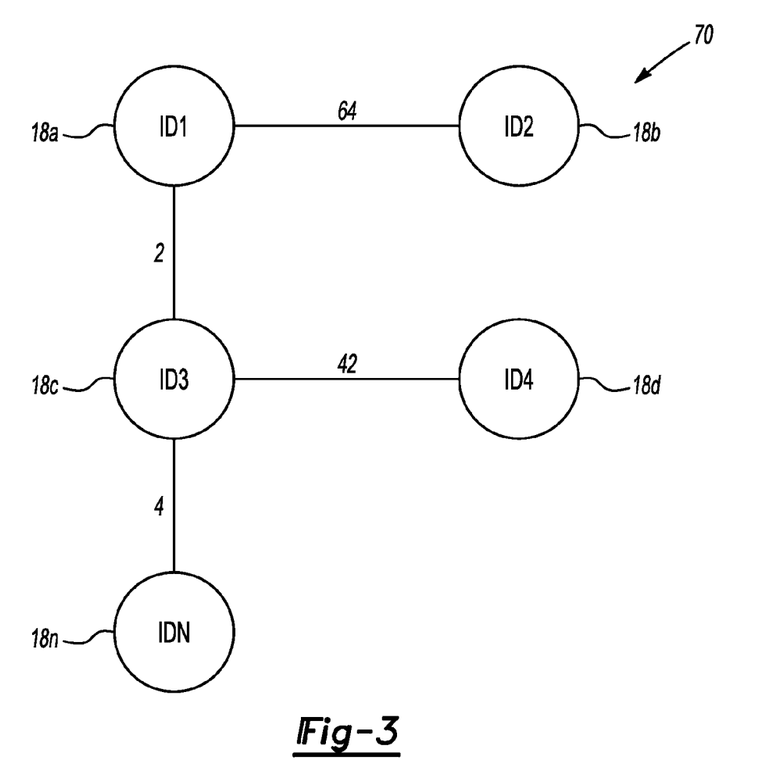
FIG. 3 depicts an example of a single graph generated from all of the sub-graphs established by the distributed computing devices within the network.

FIG. 3 generally depicts an example of the single graph 70 that comprises the sub-graphs established by the distributed computing devices 16a-16n in the network 12. The graph 70 comprises vertices (also known as the various clients 18a-18n in the system 10) and edges. An edge is illustrated as a link between the various clients 18 (e.g., see ID1, ID2, ID3, ID4, and IDN). The weighted value (see number on the edges) represents the number of common social interactions between the clients 18a-18n. As noted above, the interactions may be, but not limited to, the types of data being accessed by the clients 18a-18n from the distributed computing device 20a-20n, communication patterns between the clients 18a-18n, and/or the historical information regarding the length of time various clients 20a-20n access similar data objects.

Each distributed computing device 16a-16n perform cluster analysis which is the process in which the various clients are grouped together to form a particular affinity group based on the amount of the weighted value. Larger weighted values are indicative that a large number of interactions are detected to exist between the clients. Such groups that exhibit larger weighted values are grouped together to form an affinity group. Smaller weighted values are indicative of a small number of interactions that are detected to exist between clients which may establish that such clients are not to be placed in a particular affinity group.

As shown in graph 70, and exhibited in FIG. 1b, based on the weights illustrated in FIG. 3, the first affinity group includes ID1 and ID2, the second affinity group includes ID3 and ID4, and the third affinity group includes IDN. As further shown in graph 70, the weighted value between ID1 and ID3; and ID3 and IDn are relatively weak, therefore ID3 and ID4 is not considered to be part of the affinity group that includes ID1 and ID2 or part of the affinity group that includes IDN.

Figure 4:
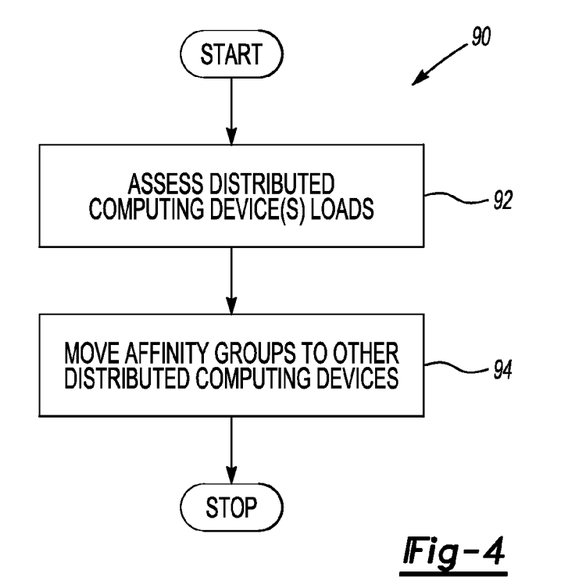
FIG. 4 depicts a method for co-locating affinity groups in the distributed network in accordance to one embodiment of the present invention.

FIG. 4 depicts a method 90 for co-locating affinity groups in the distributed network 12 in accordance to one embodiment of the present invention. It is recognized that the operations disclosed in connection with the method 90 may be performed in any order. For example, one or more of the operations can be executed in parallel or in series. The particular order in which the operations of method 90 are executed may vary based on the desired criteria of a given implementation.

In operation 92, the load balancer 15 monitors the health information for each distributed computing device 16a-16n. For example, the load balancer 15 monitors the overall efficiency and/or operating capacity for each of the distributed computing devices 16a-16n based on the health information transmitted from the distributed computing devices 16a-16n. It is recognized that operation 92 may be performed independent of establishing the various affinity groups or concurrent with the operations of establishing the various affinity groups as noted in connection with the method 50. Efficiency and/or operating capacity may serve as an indicator as to whether a particular distributed computing device has failed or has been removed entirely from the network 12.

In operation 94, the load balancer 15 controls one or more of the distributed computing devices 16a-16n to co-locate various affinity groups to other distributed computing devices 16a-16n that is operating at a lower operating capacity or higher efficiency to process tasks for that particular affinity group. For example, the load balancer 15 may control the affinity group that includes the clients 18a and 18b to move from the distributed computing device 16a to the distributed computing device 16 in moments in which the distributed computing device 16a exhibits poor health and the distributed computing device 16 exhibits good health.

In general, the load-balancer 15 is configured to dynamically co-locate the affinity groups as a function of overall efficiency and/or operating capacity in real time and move affinity groups to various distributed computing device that are lightly utilized. It is recognized that the stronger the affinity group, the more likely it is that the affinity group will not be split up while it is co-located to a particular distributed computing device. The grouping of clients on a distributed computing device may ensure that those respective clients that are interacting with one another will reside on the same distributed computing device. As new distributed computing devices are introduced into the network 12, the primary device 14 may move affinity groups to the new distributed computing devices as a whole to balance the load of the network 12. As distributed computing devices are removed (either intentionally or due to failure), the affinity group that was being serviced by such a distributed computing device can be co-located to different distributed computing devices thus making it less likely that removing a resource will cause a cascading failure due to overloading of other distributed computing devices.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for determining one or more affinity groups in a distributed network, the apparatus comprising:
    a first distributed computing device operably coupled to a plurality of clients for enabling electronic interactive activities therebetween, the first distributed computing device being configured to:
        detect at least one network interaction among the plurality of clients, the at least one network interaction includes generally similar communication patterns that are exhibited between the plurality of clients and the first distributed computing device;
        generate at least one weighted value based on the number of detected network interactions; and
        establish an affinity group comprising at least one client from the plurality of clients based on the at least one weighted value;
    wherein the first distributed computing device is further configured to be operably coupled to a primary computing device and to a second distributed computing device;
    wherein the first distributed computing device is further configured to transmit first health information indicating operating capacity and efficiency for the first distributed computing device to the primary computing device that also receives second health information indicating operating capacity and efficiency for the second distributed computing device; and
    wherein the first distributed computing device is further configured to be controlled by the primary computing device to move the affinity group to the second distributed computing device if the first health information indicates that the first distributed computing device is operating at a high capacity and the second health information indicates that the second distributed computing device is operating at a low capacity such that the second distributed computing device executes tasks for all clients within the affinity group while the first distributed computing device operates at the high capacity.

2. The apparatus of claim 1 wherein the at least one network interaction includes generally similar types of data that is being accessed by the plurality of clients.

3. The apparatus of claim 1 wherein the at least one network interaction includes accessing generally similar sets of data objects from the first distributed computing device between the plurality of clients within a predetermined time interval.

4. The apparatus of claim 1 wherein the interactive electronic activities comprise one of an on-line game and a virtual world.

5. The apparatus of claim 1 wherein the first distributed computing device is further configured to execute all tasks for the at least one client from the plurality of clients within the affinity group.

6. A method for determining one or more affinity groups in a distributed network, the method comprising:
    enabling, at a first distributed computing device, electronic interactive activities with a plurality of clients;
    detecting, at the first distributed computing device, at least one network interaction among the plurality of clients;
    generating, at the first distributed computing device, at least one weighted value based on the number of detected network interactions;
    forming an affinity group including at least one client from the plurality of clients based on the at least one weighted value;
    wherein detecting, at the first distributed computing device, at least one network interaction among the plurality of clients further comprises detecting generally similar sets of data objects that are accessed at the first distributed computing between the plurality of clients within a predetermined time interval;
    enabling, at the first distributed computing device, communication with a second distributed computing device and a primary computing device;
    transmitting, from the first distributed computing device, first health information indicating operating capacity and efficiency for the first distributed computing device to the primary computing device that receives second health information indicating operating capacity and efficiency for the second distributed computing device; and
    receiving, at the first distributed computing device, a signal from the primary computing device to move the affinity group to the second distributed computing device if the first health information indicates that the first distributed computing device is operating at a high capacity and the second health information indicates that the second distributed computing device is operating at a low capacity such that the second distributed computing device executes tasks for all clients within the affinity group while the first distributed computing device operates at the high capacity.

7. The method of claim 6 wherein detecting, at the first distributed computing device, at least one network interaction among the plurality of clients further comprises detecting, at the first computing device, generally similar types of data accessed by the plurality of clients.

8. The method of claim 6 wherein the detecting, at the first distributed computing device, at least one network interaction among the plurality of clients further comprises detecting, at the first computing device, generally similar communication patterns between the plurality of clients.

9. The method of claim 6 further comprising executing all tasks, at the first distributed computing device, for the at least one client from the plurality of clients within the affinity group.

10. An apparatus for moving an affinity group from a first distributed computing device to a second distributed computing device in a distributed network, the apparatus comprising:
    a primary computing device being in communication with a first distributed computing device that is operably coupled to a plurality of clients that (i) generates at least one weighted value based on a number of detected network interactions among the plurality of clients and (ii) forms an affinity group comprising at least one client from the plurality of clients based on the at least one weighted value, the primary computing device being configured to:

receive first health information indicating operating capacity and efficiency for the first distributed computing device;

receive second health information indicating operating capacity and efficiency for the second distributed computing device; and control the first distributed computing device to move the affinity group to the second distributed computing device based on the operating capacity and efficiency provided on the first health information and the second health information.

* * * * *

UNITED STATES PATENT AND TRADEMARK OFFICE
CERTIFICATE OF CORRECTION

PATENT NO. : 8,380,843 B2  Page 1 of 1
APPLICATION NO. : 12/556672
DATED : February 19, 2013
INVENTOR(S) : Jane Loizeaux It is certified that error appears in the above-identified patent and that said Letters Patent is hereby corrected as shown below:

Title Page, Item (54) and in the specification, Column 1, Line 1, Title,

Delete:

"SYSTEM AND METHOD FOR DETERMINING AFFINITY GROUPS AND CO-LOCATING THE AFFINITY GROUPS IN A DISTRIBUTING NETWORK"

And insert:

--SYSTEM AND METHOD FOR DETERMINING AFFINITY GROUPS AND CO-LOCATING THE AFFINITY GROUPS IN A DISTRIBUTED NETWORK--

Signed and Sealed this
Eighteenth Day of June, 2013

Teresa Stanek Rea
*Acting Director of the United States Patent and Trademark Office*